(12) United States Patent
Arsenault et al.

(10) Patent No.: US 11,966,945 B2
(45) Date of Patent: *Apr. 23, 2024

(54) CONDUCTING MULTIVARIATE EXPERIMENTS

(71) Applicant: 3M INNOVATIVE PROPERTIES COMPANY, St. Paul, MN (US)

(72) Inventors: Frederick J. Arsenault, Stillwater, MN (US); Brian E. Brooks, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,193

(22) Filed: Jul. 17, 2023

(65) Prior Publication Data

US 2023/0360081 A1    Nov. 9, 2023

Related U.S. Application Data

(63) Continuation of application No. 17/355,318, filed on Jun. 23, 2021, now Pat. No. 11,741,494, which is a continuation of application No. 15/114,443, filed as application No. PCT/US2015/013163 on Jan. 28, 2015, now abandoned.

(60) Provisional application No. 61/933,041, filed on Jan. 29, 2014.

(51) Int. Cl.
G06Q 30/00        (2023.01)
G06Q 30/0242     (2023.01)

(52) U.S. Cl.
CPC ................. *G06Q 30/0242* (2013.01)

(58) Field of Classification Search
None
See application file for complete search history.

(56) References Cited

U.S. PATENT DOCUMENTS

| | | |
|---|---|---|
| 6,647,269 B2 | 11/2003 | Hendrey et al. |
| 8,138,930 B1 | 3/2012 | Heath |
| 8,392,350 B2 | 3/2013 | Brooks et al. |
| 2005/0159921 A1 | 7/2005 | Louviere et al. |
| 2006/0200253 A1 | 9/2006 | Hoffberg et al. |
| 2007/0063875 A1 | 3/2007 | Hoffberg |
| 2007/0114279 A1 | 5/2007 | Lessing et al. |
| 2007/0156382 A1 | 7/2007 | Graham, II et al. |
| 2008/0139181 A1 | 6/2008 | Lokshin et al. |
| 2009/0012847 A1 | 1/2009 | Brooks et al. |
| 2009/0012848 A1 | 1/2009 | Brooks et al. |
| 2009/0113468 A1 | 4/2009 | Steelberg et al. |

(Continued)

FOREIGN PATENT DOCUMENTS

| | | |
|---|---|---|
| EP | 2509038 A1 | 10/2012 |
| WO | 2010039378 A2 | 4/2010 |

(Continued)

OTHER PUBLICATIONS

International Search Report for PCT International Application No. PCT/US2015/13163, dated Apr. 20, 2015, 2 pages.

(Continued)

*Primary Examiner* — Michael Bekerman
(74) *Attorney, Agent, or Firm* — Bryan Walker

(57) ABSTRACT

Systems and methods for organizing and controlling the display of content, then measuring the effectiveness of that content in modifying behavior, within a particular temporal and special dimension, so as to minimize or eliminate confounding effects.

20 Claims, 9 Drawing Sheets

(56) References Cited

U.S. PATENT DOCUMENTS

| | | |
|---|---|---|
| 2009/0163187 A1 | 6/2009 | Terrell, II |
| 2010/0138286 A1 | 6/2010 | Steinberger et al. |
| 2010/0280874 A1 | 11/2010 | Thorn |
| 2010/0332288 A1 | 12/2010 | Higgins et al. |
| 2012/0054303 A1 | 3/2012 | Priyadarshan et al. |
| 2012/0245995 A1 | 9/2012 | Chawla et al. |
| 2012/0246134 A1 | 9/2012 | Yu et al. |
| 2012/0304072 A1 | 11/2012 | Mercuri et al. |
| 2013/0013397 A1 | 1/2013 | Levenson et al. |
| 2013/0246162 A1 | 9/2013 | Brooks et al. |
| 2013/0275277 A1 | 10/2013 | Mihic et al. |
| 2015/0248615 A1 | 9/2015 | Parra et al. |
| 2021/0319471 A1 | 10/2021 | Arsenault et al. |

FOREIGN PATENT DOCUMENTS

| | | |
|---|---|---|
| WO | 2013074947 A2 | 5/2013 |
| WO | 2014059234 A1 | 4/2014 |
| WO | 2015116614 A1 | 8/2015 |

OTHER PUBLICATIONS

Liebman, Elad, Maytal Saar-Tsechansky, and Peter Stone. "Dj-mc: A reinforcement-learning agent for music playlist recommendation." arXiv preprint arXiv:1401.1880 (2014). (Year: 2014).

CONDUCTING MULTIVARIATE EXPERIMENTS

CROSS REFERENCE TO RELATED APPLICATIONS

This application is a continuation of U.S. application Ser. No. 17/355,318, filed Jun. 23, 2021, which is a continuation of U.S. application Ser. No. 15/114,443, filed Jul. 27, 2016, which is a national stage filing under 35 U.S.C. 371 of PCT/US2015/013163, filed 28 Jan. 2015, which claims the benefit of U.S. Provisional Application No. 61/933,041, filed 29 Jan. 2014, the disclosures of which are incorporated by reference in their entireties herein.

BACKGROUND

Internet commerce grew massively and continues to grow, in part because it is a medium for marketing and communication that is susceptible to experimentation, with a well-defined feedback loop established by the act of clicking on a piece of content to follow a link. The simplicity of such a relationship between the content and the response, along with means of defining who is acting, that enables the testing and optimization of content through means such as Google Analytics, and has enabled business models such as pay-per-click due to the naturally closed loop of internet behavior.

A variety of communications channels have emerged in the last few years. They include social media, mobile devices, IPTV, in-store digital signage and digital billboards, among others. These channels are characterized by a great deal of control over the content that is presented and the ability to change the content readily. Most of these cannot be directly linked to many important viewer behaviors such as purchasing decisions, because they lack a distinct interactive behavior (analogous to a "click" in internet advertising). There is strong interest in finding ways to identify a return signal for each of these means of content presentation, both in forms that can isolate individual channels and for integrated systems across those channels that can measure the effects of combined content received from those multiple channels, and for purposes ranging from improving the effects of advertising campaigns to enhancing public health messaging to improving traffic control technologies.

Current efforts to capture the impact of content on behavior are centered either on token creation or data mining. Token creation involves introducing some additional behavior to link the promotion to an individual's purchase through methods such as Microsoft TAG, couponing programs such as Groupon, loyalty rewards programs and check-ins such as social media platforms. These approaches tend to produce small and biased samples as a result of the need to opt-in or take additional steps to utilize the token, and typically suffer from increased cost and complexity due to a need to actively induce users to participate in the token system. They also struggle to be adopted because the additional required behavior enabling measurement necessarily alters the within-location experience. Data mining requires a significant volume of data, and is limited to correlation studies, not active cause-and-effect experimentation.

SUMMARY OF THE INVENTION

Systems and methods for performing experiments on content effectiveness using multiple content distribution channels, some of which having an overlapping spacial or temporal factors. Content effectiveness may be measured based on response data received. In some embodiments the response data comes from areas outside of a content channel's immediate spacial area, but within an associated spacial area—in such embodiments, such a broader response area may be accommodated by arranging content delivery channels into hierarchies.

DETAILED DESCRIPTION OF THE EMBODIMENTS

Figure 1:
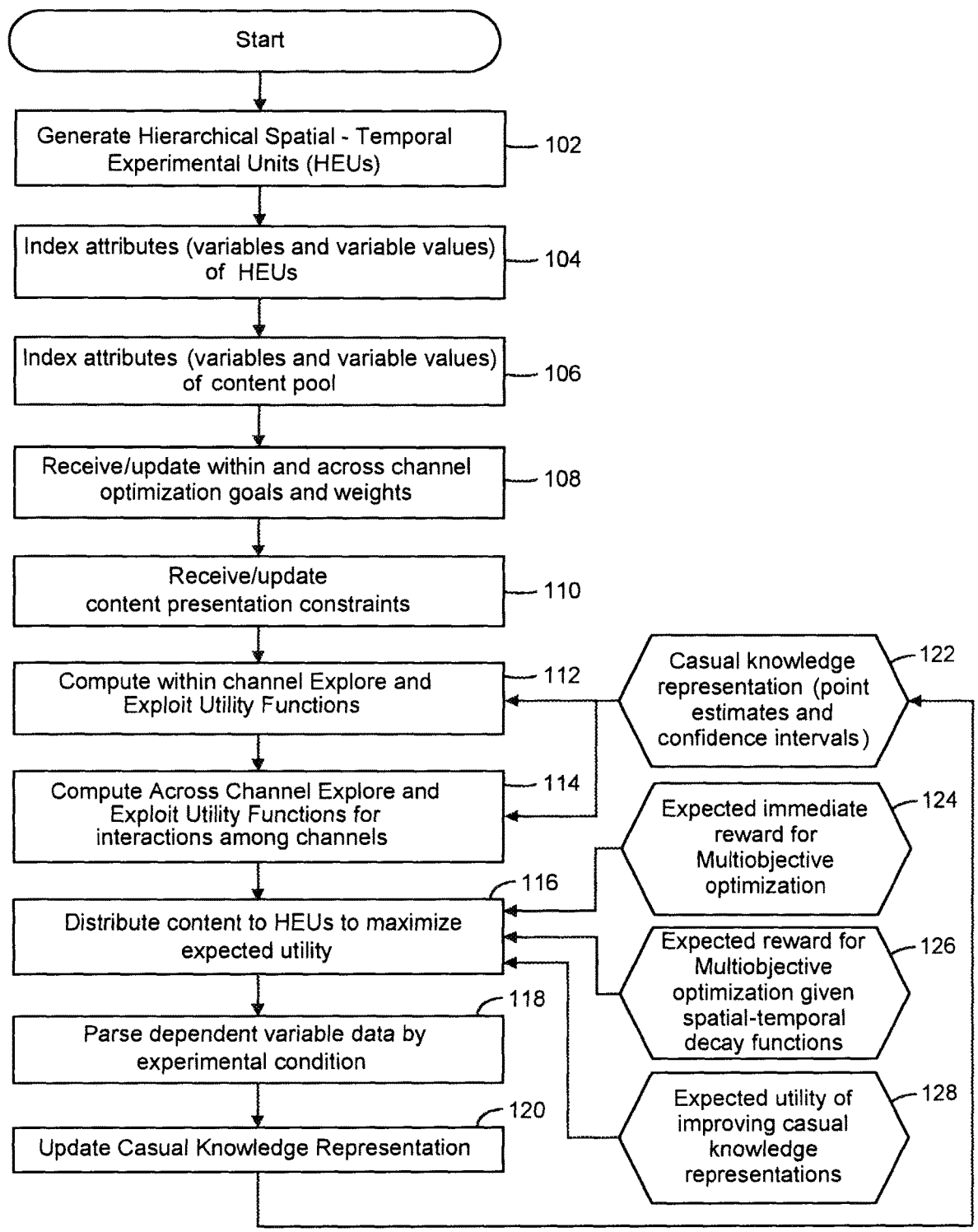
FIG. 1 is a flowchart outlining the process of getting feedback regarding content distributed across multiple digital channels.

The off-line world demands analogous capabilities to test the effectiveness of content in influencing behavior and in selecting content to drive particular behaviors and outcomes. However, the off-line world does not readily allow for the kinds of unconfounded content presentation that websites do, and lack the closed feedback loop of the internet, since the content and the desired behavior lack the closed loop made possible by the internet, and where more confounds can muddy the relationship between the content and behavior.

The closed loop fails to exist in the off-line world because the relationship between off-line communications content and off-line behaviors is far more difficult to track and far more complex. Instead of being served content in response to a discrete request for a website, and interacting directly with the content through a click, content comes through multiple channels and is displayed regularly or continuously without user input, and the desired behavior is usually undertaken through means that do not require interaction with the content, such as purchasing a particular item, or moving from one particular region within a location to another. The physical world also has more layers, or channels, of media presentation than the online economy. For example, and as further discussed below, channels include digital in-store advertising; content presented on a user's mobile phone; content provided to a user on his or her computer; content displayed on a roadside digital sign, etc.

As a result, it is essential for measurement and optimization techniques to be able to develop understandings of interactions among the various channels of media presentation, and coordinate the content presented on such multiple channels.

Conducting experimental research generally requires an experimental unit, and the development and implementation of an experimental design, including the management of confounds. It has been discovered that to eliminate potential confounds and structure an experiment for a channel of content communication, spatial and temporal reach factors of a particular channel are accounted for in defining experimental units, assigning content to those experimental units, and collecting and processing data from those experimental units.

The temporal reach factor, generally, is the period of time from exposure to the channel until it is likely that a content recipient has taken an action in response to the content. In some embodiments, this period of time is essentially a confidence interval regarding the amount of time a population spends between receiving a message and acting upon it through a purchase or entering a location or other such behaviors responsive to the content, such as the time between observing a digital sign and making a purchase at a location, or the time between viewing content delivered on a mobile device and visiting a location promoted by that content. Temporal reach factors may be estimated by system users and content presenters, or may be derived from data such as observations of consumer dwell time, marketing studies, and other data reflecting actual content recipient behaviors relevant to the time during which the content recipient may be influenced by the content. The temporal reach factors may be represented as a likelihood that the behavior may be observed within a given amount of time, for example the period of time which is the 95% confidence interval that someone entering a store has completed their final transaction for that visit may be used as the customer visit duration, the temporal factor for in-store digital displays.

The spatial reach factor, generally, is the region in which a content recipient will likely take action after receiving content. This is often based on the particular channel used, typically due to the desired impact of the message given the content. For example, content delivered by digital signs in a store environment is typically directed to affecting the visit to that store environment, while content delivered to the mobile device of a user outside of a store environment is typically directed to pushing a recipient to travel to a nearby location and undertake an activity, such as purchasing a searched-for item, and a digital billboard presents content directed to suggesting an activity to undertake during trips passing by that billboard. The expected region can be based on raw distances (such as a certain radius around the point at which content is delivered) from the point of content delivery, or derived from data such as traffic data, consumer behavior data linking regions to particular stores, demographic and socioeconomic data regarding regions of content delivery and responses to content by those regions, market segmenting data for geographic regions, or other data that is indicative of the likely regions in which content viewers or recipients will act in response to that content. This may also be based on probabilities of action, such as the 95% confidence interval for the area within which a viewer of a hand-washing reminder displayed in a hospital would use a hand sanitizer dispenser may be used as the spatial reach factor for that hand-washing reminder.

Channels for content delivery, generally, are digital displays, in some embodiments having common control, and sharing characteristics such as the general category of display, the locations where displays on the channel are situated, and the purpose of the displays. The displays in a channel share temporal and spatial factors due to their common general nature and purposes, and in embodiments of this method, are subject to common control of the pieces of content that are displayed. This control of the pieces of content displayed may be exercised through specific selection of content for display, providing playlists to the displays, providing rules for percentages of content play, providing content elements for assembly into content and/or providing rules governing the automatic generation of content to the players. The displays within a particular channel for content delivery may differ in various ways, such as the specific model or dimensions of the digital display. The channel may, in some embodiments, be associated with an intermediate metric, which is used to identify the particular effectiveness of that channel for content distribution through measuring behaviors driven by that channel for content delivery.

One example of a channel for content delivery is fixed-location digital displays within a subsection of a location such as a particular section of a store or one intersection in a downtown area. Content in these applications may be, for example, content directing viewers to visit other subsections of the same store for related items, or presenting route information specific to that one intersection. Within a subsection of an area, the temporal reach factor may be the quantity of time a visitor spends in that particular subsection and the spatial reach factor may be the boundaries of that particular subsection. For fixed-location digital displays managed on a subsection level, the intermediate metric may be, for example, traffic in adjacent subsections of the store.

In some embodiments, a set of fixed digital displays for an entire location such as a store or a hospital may constitute a single channel for content delivery. In these embodiments, the temporal reach factor may, for a store, be the customer visit duration, the amount of time a consumer spends from entering the store location until the last time at which at least a significant percentage (usually 95%) of customers will have completed any transactions they would make in the store location. The spatial reach factor is a radius within which the content displayed in the location will impact behavior; this is based on behavior data collected about visitors and may extend beyond the location. For fixed digital displays affecting a whole store location, the intermediate metric may be, for example, rates of interaction with an in-store kiosk.

In some embodiments, the channel of content delivery may be providing content to mobile devices that are available to receive content. In these embodiments, the temporal reach factor is a recipient response period, the amount of time from receiving mobile content until the end of the period most content recipients (typically 95%) have acted or not acted in response to received content. The spatial reach factor is now a region around the point of content delivery. In some embodiments, the region is generated based on the specific point of content delivery. In other embodiments, the region is based on the point of content delivery being within a sub-region. The recipient response period and the region may be defined based on a particular radius from the point of content delivery, or may be defined using more complex models of content recipient behaviors, based on data such as socioeconomic data, traffic flow maps, consumer profile data, store data, rewards programs, and other data indicative of where a content recipient would act on received content. The location of the mobile device may be estimated through various known location services such as IP address, location services, GPS, cell tower triangulation or other means by which the device communicates its location in physical space. An example of an intermediate metric for mobile device content is interactions with received pieces of mobile content, such as redemptions of offers distributed to mobile devices.

Other channels for content delivery include IPTV, web content requests, or social media activities. Each of these has temporal reach factors based on a recipient response period, defined as above and calculated separately for each particular channel of content delivery and observed content recipient behavior from that channel. The spatial reach factor for each of these channels is a region around the point of content delivery, generated either on the specific point of delivery, or based on delivery of content within a specific sub region. The region may be based on a distance around the point of delivery, typically a distance selected based on consumer behavior patterns, or defined more specifically through models of content recipient behaviors, based on data such as socioeconomic data, traffic flow maps, consumer profile data, store data, rewards programs, and other data indicative of where a content recipient would act on received content. The location of the device receiving and presenting content may be estimated through various known location services such as IP address, location services, GPS, cell tower or wireless signal triangulation or other means by which the device communicates its location in physical space. An example of an intermediate metric for internet-based activities such as social media, IPTV and internet content may, for example, be click-through rates on ads placed in these contexts.

Another channel for content delivery is digital billboards. For digital billboards, the temporal reach factor is a viewer response duration. In some embodiments, the spatial reach factor is a region surrounding one billboard; in other embodiments, it is a region surrounding a number of networked billboards. The region may be defined in some embodiments by a distance around the billboard or billboards, typically a distance selected based on consumer behavior patterns, or defined more specifically for the billboard or billboards through models of content recipient behaviors, based on data such as socioeconomic data, traffic flow maps, consumer profile data, store data, rewards programs, and other data indicative of where viewers of the billboard or billboards would act on the presented content. An example of an intermediate metric for mobile device content is the number of visitors to a store location within the response area.

Other channels of content delivery may also be used in some embodiments of the present invention, accounting for the particular spatial and temporal reach factors associated with those channels based on the general nature of the temporal reach factor as the time between content exposure and the probable occurrence of related behavior, and the spatial reach factor as the region over which behaviors are likely to occur in response to content presented on a given channel for content delivery. Optionally, those channels of content delivery may be associated with intermediate metrics used to measure the particular impact of those channels.

FIG. 1 is a flow chart of a method for conducting an experiment on content effectiveness across a plurality of channels for content delivery. In some embodiments, the method includes the generation of Hierarchical Temporal-Spatial Units (HTSUs) 102. The channels for content delivery involved in the experiment are determined, and HTSUs are defined for each channel of content delivery included in the experiment, based on the spatial and temporal reach factors particular to each of those channels. The channels involved in the experiment may be identified by user input, or by querying all content delivery devices available to a system implementing this method. For each channel for content delivery, the scope of the HTSU is defined according to the temporal and spatial reach factors of that channel for content delivery. Temporal reach factors are the period over which content delivered by a channel may influence behavior; they may be expressed as a probability of an action (or the corresponding failure to act) occurring within a time window following the content exposure. The temporal reach factor is particular to the channel being used to deliver or present content, and may also be influenced by the type of content being presented, such as advertisements for different products or services that are purchased on different schedules or with differing levels of consumer deliberation, or the transient nature of some behaviors such as following a series of directions to an event in a location. Temporal reach factor data may be derived from such data as traffic flow observations, store transaction rates, and observed customer visit durations, or other statistical measures of the period between content exposure and action potentially influenced by the content; this includes population statistics and confidence intervals observed regarding the duration of between exposure and action across populations. Content exposure may, depending on the channel of communication, be determined based on being in proximity to the presentation of the content, or the delivery of that content to a device such as a mobile device or computer accessing a webpage. The action may be unrelated to the means of content delivery, such as making a purchase at a store check-out register after seeing an advertisement on a nearby digital billboard. The HTSU has a response duration based on this temporal reach factor to ensure that there exists a period of each HTSU where the actors undertaking the observed behaviors could have been exposed to the content of the current HTSU, but not of the content in the prior HTSU for the same content channel. In some embodiments, the response duration is calculated by receiving the temporal reach factor as a period of time, such as the period for a store during which 95% of visitors to the store have completed their final transaction of that visit, and then doubling that period of time to produce the response duration for the HTSUs of that channel.

The spatial reach factors are based on the area over which content presented via a display on a particular channel for content delivery may influence behavior. The spatial reach factor may be based upon data such as traffic data, consumer profile data linking regions to particular store locations, demographic and socioeconomic data regarding regions of content delivery and responses to content by those regions, market segmenting data for geographic regions, or other data that is indicative of the regions in which content viewers or recipients will likely act in response to that content with a known or estimated probability. The HTSU has a response area based on this spatial reach factor to ensure that data recorded within the response area is unlikely to have been influenced by content delivered on the same channel in adjacent regions. For example, the response area of the HTSU may be derived by receiving the temporal reach factor as a radius within which viewers of content are likely to act, such as the 95% confidence interval for the distance people will travel to act on a piece of content they received on their mobile device, and doubling that radius to find the radius for the response area of the HTSU.

Once the scope of the HTSUs has been defined for each channel, the display locations and times those displays are functioning are parsed into specific HTSUs having response areas of the determined size and response durations of the determined duration. The HTSUs may be ordered into hierarchies based on the scope of each different channel's HTSUs determined in step 102. This process of building hierarchies of HTSUs is detailed in FIG. 2, which represents an embodiment of the process for generating a hierarchy of spatial-temporal experimental units which can implement a multi-channel experiment on content effectiveness. HTSUs are generated for the available channels 202, based on the spatial and temporal reach factors for each channel, as described in step 102 of FIG. 1.

The channel having the largest HTSU is selected 204 based on the size of the response area of the HTSUs of the different channels. Once the channel having the largest HTSU is selected 204, a content serving location on that channel is randomly selected 206. The selection is random on the first iteration, and on subsequent iterations, the randomness is constrained such that the selection is randomized among all content serving locations that are currently not yoked to an identified group. A group is created by yoking all content serving locations within the response area of the selected content region together 208, and assigning a unique identifier to that group 208. Yoking together content serving locations within an HTSU associates those locations and ensures that they are associated with one another and will be assigned the same content during the response duration of the HTSU, controlling the content delivery to ensure that content serving locations do not confound an experimental design and that behaviors observed in the response area can be tied to specific presentations of content. The response area of the content is based on at least twice the size of the spatial reach factor for that particular channel. This process is iterated until all content serving locations have been assigned to a group, by checking for unyoked content serving locations 210.

Once it has been determined that all content serving locations for the largest HTSU have been yoked into groups 210, the channel having the next largest HTSU is selected 212 or the HTSUs for that channel are generated in accordance with 102. For this next-largest channel, again determined by the spatial reach factor for the channel, a group created in 208 or 218 for the channel above the current channel is selected at random 214. A content serving location for the channel and within the selected group is selected at random 216 from among the locations not currently yoked to a group. The randomization of the selection in 216 is constrained to prevent a content serving location from being selected if it is already yoked into a group. The selected content serving location and all content serving locations using that channel and within the response area are yoked together and assigned a group identifier 218. Once a yoked group is created 218, unyoked content serving locations within the larger group are identified 220 and, if any are found, the selection stage 216 and yoking stage 218 are repeated until all content serving locations within the group of the next larger channel are yoked. Once all content serving locations within a group of the next larger channel have been yoked, another group within the larger channel is selected 214 and content serving locations are selected 216 and yoked 218 if there are other groups in that larger channel that have not had content serving locations within them selected 216 and yoked 218. If it is determined that all locations of a level of the hierarchy have been assigned to groups, the channel having the next largest HTSU is selected and it is run through this process, continuing until all content serving locations on all channels are yoked.

Returning to FIG. 1 now, with the HTSUs themselves defined, generated, and ordered into a hierarchy 102, the attributes for each HTSU in the hierarchy are indexed 104. Attributes that are indexed for the sake of coordinating content presentation across the network include: the time at which the particular HTSU begins and ends, any groups to which the HTSU is yoked, the location of content delivery for the HTSU, the region covered by the HTSU, and the relationships of each HTSU to other HTSUs for different channels that are above or below the HTSU in the defined hierarchy formed by the yoking operations outlined in FIG. 2. This indexed data may be stored in memory for use in subsequent aspects of content assignment.

The attributes of the content pool are indexed 106. This indexing is done for each piece in the content pool, recording the content attributes relevant to coordinating the display of content, such as the behavior the content is intended to influence, the display characteristics of the content, identifiers or labels for the content, strategic or tactical aspects of the content regarding influencing viewer behavior, associations of the content with particular manufacturers or business entities, and the content elements and attributes defining the content, and confound relationships between pieces of content. Confound relationships may be based on the observed or expected effects of the content, by other content characteristics, or defined by specific user requests for pieces of content to be compared to one another. This indexing may be done using, for example, automated analysis of the content files themselves, tags associated with content pieces (the tagging performed either by users, or automatically based on observed or predicted content effects, such as the behavior levels associated with playing a given piece of content) such as content metadata, content information stored in a separate database referencing the content pieces, the specific content elements comprising the content, the relationships among content elements that define the arrangement of the content, or metadata applied to the content.

Optimization goals and weights are received and/or updated 108. These optimization goals and weights are parameters used to determine the utility of playing certain pieces of content, either to conduct an experiment or to optimize the expected results for the selection of content to be played. Goals are metrics based on the collected data indicative of content effectiveness and are key parameters for determining the utility of content, while weights are a factor used to allow for the comparison of diverse goals, such as increasing sales of two items that are typically in at least partial competition with one another, such as salads and chicken sandwiches in a restaurant. The goals and weights may be selected by the user to define permissible tradeoffs, or derived from business data such as the gross profit margins on the sales of particular items. The optimization goals and weights include both within-channel parameters and cross-channel parameters. Within-channel goals include intermediate metrics measured for each channel, such as in-store traffic driven by digital billboard messaging. Cross-channel goals are overall goals for a multi-channel content presentation pattern, such as overall retail sales or gross profits during a given HTSU. Weighting factors may be used to convert those goals into optimization values on a common scale, either concrete (e.g. dollars) or arbitrary (e.g. an optimization metric) for use in calculating the utilities of certain content selections that may influence a set of potentially diverse goals, such as driving sales of partially competing items, for example, salads and grilled chicken sandwiches at a quick-serve restaurant, or store-brand and name-brand variations of a particular product in a large retailer.

Content presentation constraints are received 110. The content presentation constraints may include display constraints, such as the size, orientation, resolution, and capabilities of a particular display on a channel, and in some embodiments business constraints such as particular content combinations that are impermissible, or content attributes that must be set based on business constraints (for example, using highly specific color selections in a particular cola advertisement, based on that cola's branding requirements). The display constraints may be received from memory where this information is stored, or received from querying the players regarding the display constraints. Confound relationships indexed in step 106 for the pieces of content may be treated as content presentation constraints and may also be part of the information received in this step, either from the index of content attributes, or from other sources of confound information, such as the nature of a particular experimental design (two content pieces that are being tested against one another are confounds to one another) or the observed or predicted effects of content.

Explore and exploit utility functions are used to calculate the within-channel utility of playing pieces of content 112. Explore utility functions determine the value of gaining additional information regarding content effectiveness in certain channels, times, and/or locations and the predicted impact of playing a piece of content and recording data on improving that content effectiveness information based on experimental power analysis, knowledge of the rate of change of content effectiveness data, and data on the effectiveness and certainty regarding the effectiveness of other pieces of content. The explore utility function may be probability-matching strategies based on the currently observed content effectiveness data, where the relative frequency with which a piece of content appears matches the likelihood, according to the content effectiveness data and the confidence intervals for that data, that it is the optimal piece of content to show to achieve a selected goal. Other approaches to the "multi-armed bandit" problem may also be applied to determining explore utilities.

Exploit utility functions are used to calculate the present value of displaying certain pieces of content on certain channels and in certain times and locations. These calculate rewards for the observed effects of content, such as driving gross profit observed in a store during an HTSU where content is playing, or reducing the number of vehicles approaching an intersection during an HTSU where alternate route data is being presented. These rewards and knowledge of content effectiveness may be utilized by machine-learning systems to pursue particular outcomes using utility functions where content effectiveness data is used to determine what content will maximize a selected value.

Explore and exploit utility functions may also be used to calculate cross-channel utilities for playing pieces of content 114. Cross-channel explore utility functions capture the potential value of learning more about the interactions between content distribution channels and particular combinations of content delivered to users. Cross-channel exploit utility functions determine the additional benefit of particular combinations of content across multiple channels and the influence of a particular piece of content on the effects likely to be seen when integrated into the entire presentation of content across all the channels; these may be expressed through representations such as Markov chains, Petri nets, or multiobjective utility functions, and may incorporate effects on channel-specific intermediate metrics.

As in 112, the utility function may include weighting for historical data that discounts the impact of older data on the utility determinations to emphasize more current content effectiveness data in selecting content for display.

The utility values calculated in 112 and 114 may be used to select content for play in each of the HTSUs 116. Content is algorithmically selected based on the expected overall utility, when combining the within- and cross-channel utility functions for all the involved channels and any weighting factors. The algorithm may be a reinforcement learning routine, a generic algorithm, Monte Carlo methods, and other machine learning techniques. Factors include the expected immediate rewards 124 for displaying the content (for example, a boost in sales during the response duration of the HTSU where the content is played, as observed in the data from prior HTSUs), the expected rewards given spatial-temporal decay functions representing continuing effects 126 (for example, hand-washing reminders engraining the habit in hospital personnel, as observed in carry-over effects observed when comparing data over time), and the expected utility of improving the causal knowledge representations 128 (for example, the benefit expected from reducing the uncertainty about the expected rewards for a piece of content, based on power analysis of experimental trials, and/or the effects of other content on the same rewards). The assignment of content to play in HTSUs may also ensure that confounding pieces of content are not assigned to the same HTSU, using indexed content data 106 and content presentation constraints 110 to identify the confound relationships, and may also use the indexed content data from 106 and established principles of experimental design to algorithmically select content such that the content assigned to the HTSUs is randomized so that content is played under a variety of different conditions across the various HTSUs, that proper amounts of each piece of content are played to ensure balancing of an experiment, that the content pieces are placed in an order that can counterbalance out the possibility of order effects in an experiment. Content selected for display within an HTSU for a channel for content delivery that is constantly displaying content is displayed on the appropriate displays within that HTSU. For channels where content display is based on opportunities such as a request or distributed on a push system, opportunities for content display are identified and the selected content is presented to that opportunity, with the opportunity being defined by the ability to present content, for example as a response to a request made to access a product manufacturer's web page, or for another example, a mobile device that has opted into a push system for notifications regarding nearby traffic congestion that is associated with a location that is within the response area of an active HTSU. The location is known through location services, cell tower triangulation, GPS, or other established methods of identifying the location of the device where content may be presented; the content selection for that active HTSU determines the type of content presented to that particular opportunity. When content is assigned to an HTSU that is yoked to other HTSUs through the steps of FIG. 2, all of the yoked HTSUs receive the same assignment of content.

Dependent variable data is parsed by experimental condition 118. The dependent variable data is the collected data about activities occurring within the response area of HTSUs in which content has been displayed and that therefore may be a response to content. Examples of dependent variable data include sales data, captured at point-of-sale systems, activity data such as hand-washing behavior based on soap level measurements at automatic hand soap dispensers, or traffic behavior such as measured transit times or the number of cars arriving at an intersection. The experimental condition of the data comprises factors relating to the data and its relation to the content, including the content presented on each channel affecting the time and location where the dependent variable data was collected, and also includes the time of the data collection, the time at which the HTSU during which data was collected began, the location of data collection, and other similar factors relating to when and where the data was collected and the content that was played in the HTSUs proximal to the collection of the data. The parsing 118 sorts the data by these factors and may include the removal of data occurring during the first temporal reach factor of each HTSU, since that period includes data that may have been confounded by content in the preceding HTSU. During the parsing 118, data recorded more than one spatial reach factor from the center of the HTSU, where content displayed adjacent HTSUs may have exerted influence on the observed behavior may also be removed from the data set. The data collection itself may be performed only during specific time periods and regions within each HTSU to remove content that may be subject to confounds from temporally or spatially adjacent HTSUs. By removing these points, the remaining data can be associated with specific pieces and/or combinations of content presented on the various channels and the confounds created by temporally or spatially adjacent HTSUs removed from the data. This parsing may separate data by type of content presented on one channel, or may parse the data by combinations of content presented within a larger HTSU for a channel and the content presented on the HTSUs for smaller channels that were within the larger HTSU. The parsing 118 is done algorithmically by a processor.

The parsed data from 118 is then used to update the causal knowledge representation 120. The causal knowledge representation is a database of the observed effects of content that is parsed in step 118 and associated with the content that was displayed at the time it was recorded. Updating the causal knowledge representation 120 may also include discarding old data; some relationships between content and behavior are dynamic (for example, marketing messages on digital displays in-store at fast food restaurants tend to lose effectiveness over time); for these cases, the best results may be obtained by having a fixed data inclusion window and discarding all data that is past a certain age. It is also possible to include the age of data as a factor in the utility functions as described steps 112 or 114 to ensure proper management of historical data when determining the utility of playing a piece of content. In some embodiments, updating causal knowledge 120 includes identifying and recording observed cross-channel effects from data parsed by the content presented on multiple channels within a common HTSU as well as single channel effects, by comparing complete sets of content received from each channel, as opposed to simply comparing observed effects among variations within one particular channel. Because content was presented in a particular manner selected by randomization constraints and excluding confounding content from HTSUs 116, the data recorded and then parsed by experimental condition 118 may provide true experimental data and therefore causal knowledge regarding content effects. For example, for an HTSU for a digital billboard where the response duration is twice the temporal factor, transactions occurring within the response area during the second half of an HTSU's response duration could potentially be influenced by the content displayed on the billboard during that HTSU, but not by other digital billboard content, and thus may be associated with the content from that HTSU.

The updated causal knowledge of content effects 122, including the certainty regarding those content effects may then be fed into the within- and cross-channel utility functions of steps 112 and 114 to calculate updated utilities for displaying pieces of content, based upon the most recent data collected.

Figure 2:
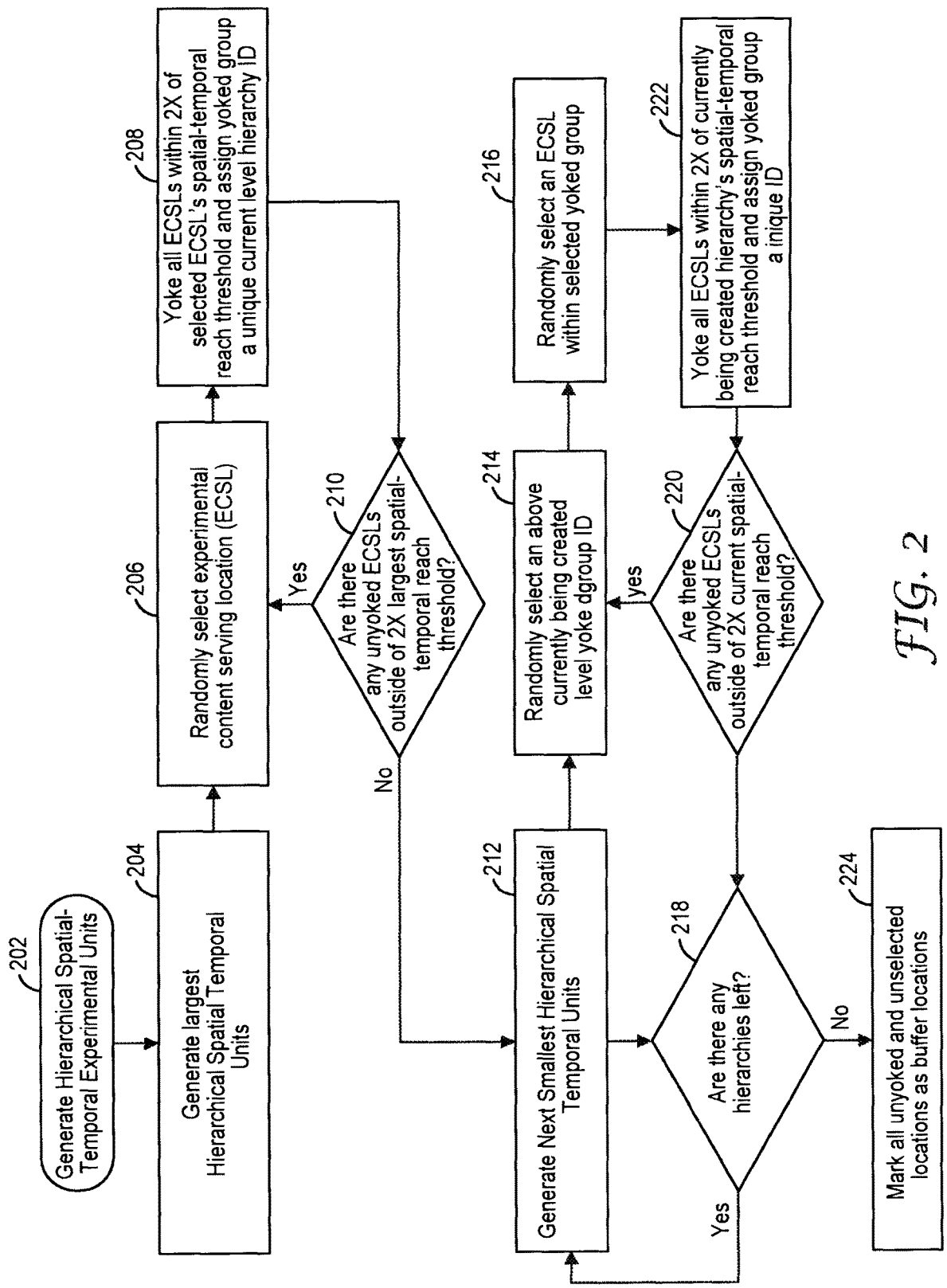
FIG. 2 is a flowchart outlining the creation of hierarchical spatial-temporal units.
Figure 3:
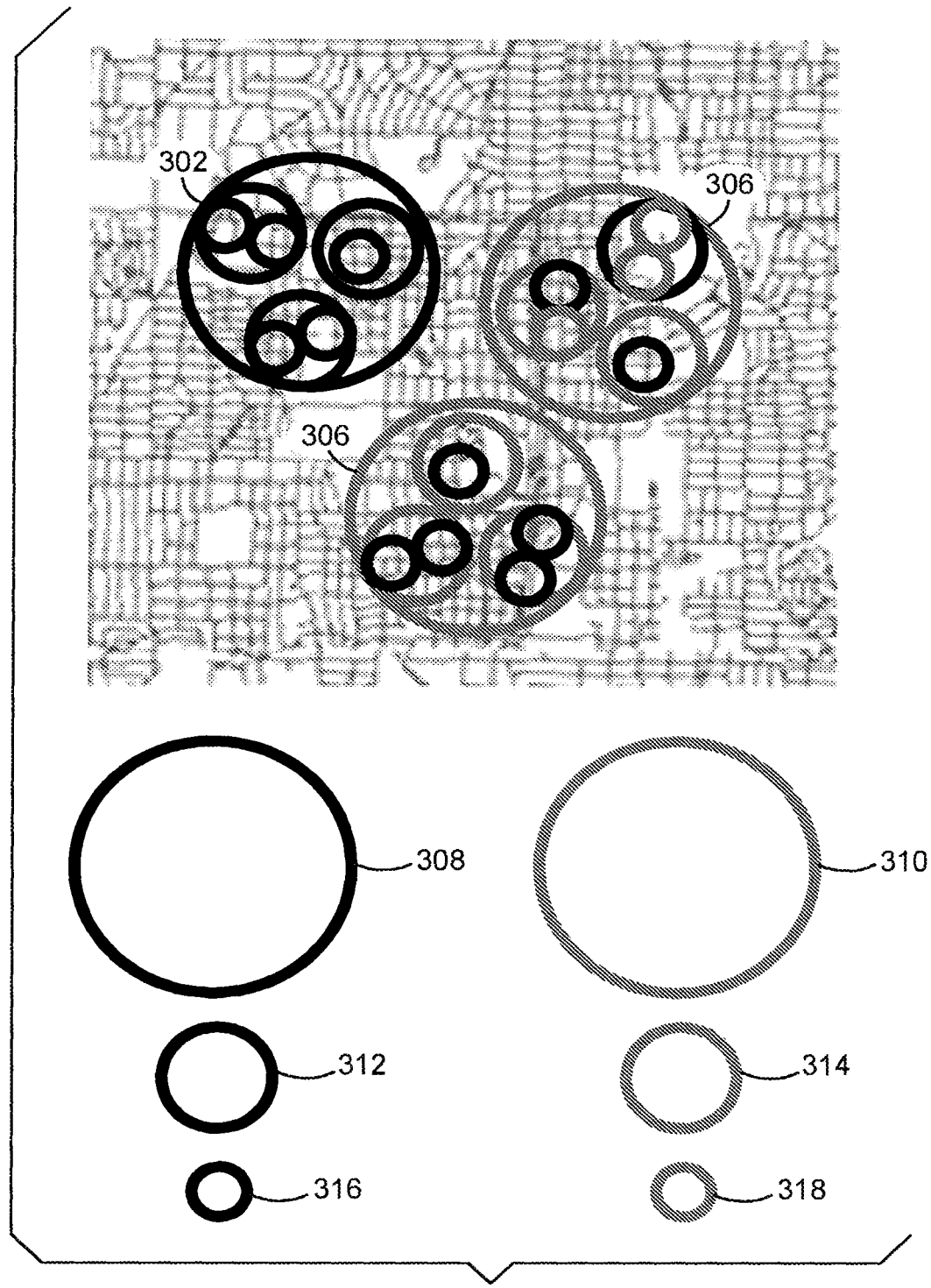
FIG. 3 is one embodiment of a map displaying the format of a hierarchy of spatial-temporal units.

FIG. 3 is an example map demonstrating the structure of a hierarchy of HTSUs created by one example of the steps of FIG. 2 and the assignment of content to those particular HTSUs for one point in time and one region of a larger network, with the content selections already made in accordance with FIGS. 1 and 2. For this example, there are three channels controlled by an embodiment of the invention. The channels are digital billboards, mobile devices, and in-store displays. The channel with the largest spatial reach factor is for digital billboard content. Mobile device content has the next largest spatial reach factor, and in-store displays have the smallest spatial reach factor. Response areas for these HTSUs are overlaid onto a map 300, showing how these units may be arranged spatially. The response area of the HTSUs for digital billboards in the example map 300 are marked by response area 308 and 310. Each of these response areas may be centered on a digital billboard. Within these areas, digital billboards will show content including the same content, variant 1 for response area 308 and variant 2 for response area 310. The response area of the HTSUs for mobile content are marked by response area 312 and 314; within these areas, mobile content requests will produce content selected based on the assigned content of the HTSU; in this case content variant 1 for response area 312 and content variant 2 for response area 314. The in-store display HTSU response areas are represented by response areas 316 and 318, where the points represent the response area of the HTSUs created for the in-store displays, the store location. Stores represented by store icon 316 are assigned present content variant 1, while stores represented by store icon 318 present content variant 2. The largest HTSUs contain different overall content presentations to the users within them across all channels of content delivery. The HTSUs on the map in response area 302, defined by a digital billboard HTSU, shows variant 1 of the billboard content, variant 1 of the mobile content to requesters, and variant 1 of the in-store content. The response area 306 shows an area where digital billboards show content variant 2, while the mobile devices respond to requests with content variant 2, while the in-store displays show variant 1. Data may be compared for a given channel, for example comparing data from just the digital billboard HTSUs of 302 and 304 as part of a larger trial comparing the mobile content variants, or may be compared for all the channels of each hierarchy, such as comparing data from all channels of content delivery in of 302 and 306 as part of a larger trial comparing the effectiveness of particular combinations of content variants on each of the channels. Lower levels of the hierarchy do not necessarily need to all be assigned the same content within an HTSU of a higher level of the hierarchy; this is represented in the mobile and in-store content variants shown in area 306. The HTSUs are nested so that the area covered by the response areas of higher level HTSUs completely contain the areas covered by the response areas of the lower-level HTSUs below them in the hierarchy, so that observed behaviors may have been influenced by content received from all of the channels in that segment of the hierarchy.

Figure 4:
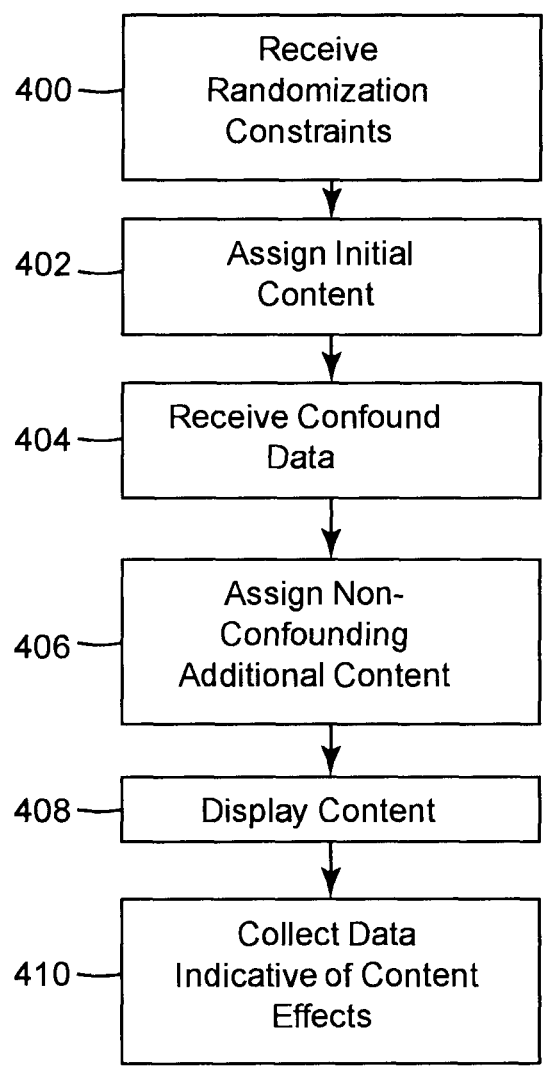
FIG. 4 is a flowchart outlining the assignment of content to an individual channel for measurement of content impact considering just that channel.

FIG. 4 is a flowchart detailing the assignment of content to HTSUs to enable a measurement of content effectiveness free of confound effects in some embodiments of the invention. For the purposes of assignment to an HTSU, content may include recipes or instructions for procedural generation of content, rules constraining content creation, rendered files, percentages of play for content pieces or other information dictating what will appear on the display. Randomization constraints are received in step 400; these constraints guide selection of content to allow implementation of an experimental design across a multitude of HTSUs. Randomization constraints may be expressed as chances of selecting a piece of content for display in an HTSU. The randomization constraints are generated based on explore utilities and principles of experimental design such as balancing. Randomization constraints, by affecting the frequency with which content is presented in HTSUs, can balance the experiment by ensuring content is selected at appropriate rates for a balanced experimental design; the balancing is particular to the design for the experiment, with examples including Latin squares, partial Latin squares, randomized block designs and other designs for clinical trials. The randomization constraints may include conditional statements that adjust the assignments based on content selections made for adjacent or nearby HTSUs, to allow the use of balancing and counterbalancing to control for order effects within an experimental design. An initial piece of content is assigned to a HTSU 402, selecting the content from the available pieces of content based on the randomization constraints. Across multiple HTSUs, the assignment of content in accordance with the randomization constraints may implement blocking, balancing and counterbalancing according to an experimental design; this information is received in the randomization constraints 400. For HTSUs that are directed towards constantly-on displays, for example, digital billboards, the assignment of content to the HTSU dictates what will appear on screen for the duration of the HTSU. For HTSUs that are directed towards displays that request content periodically, for example mobile devices, the assignment of content to the HTSU dictates what content would be delivered in responses to content requests that occur during the response area and duration of the HTSU. Once the initial piece of content is assigned 402, for constantly-on displays, the remainder of the HTSU may need to be assigned content. Content assignments to individual units must ensure that the content within a unit is not confounded by other pieces of content that are part of a trial comparing that content to a selected piece. Confound information for the content is received 404, defining what content may be played together during an HTSU and what content must be kept separate in order to ensure that data collected from an HTSU is not confounded and can be used to determine content effectiveness. Confound information may be user input or may be derived from factors such as observed or expected content effects (content pieces affecting the same metric may confound one another), or other content information such as underlying strategy, use of particular content elements, or of the system testing the effectiveness of the pieces of content against one another. The confound data received in 404 is used to ensure that confounding content is excluded from the HTSU while the remainder of the HTSU is algorithmically populated 406. The content is then displayed 408 on the displays controlled by the HTSU, such as in-store displays, or mobile displays making a relevant request for content within the response area of an HTSU. During display of the content, data is collected regarding activities occurring within the response area of the HTSU 410. This data may include such things as point-of-sale transaction data, traffic volume data, soap consumption data, or other such measurable factors indicative of behavior potentially occurring within the response area of the HTSU.

Figure 5A:
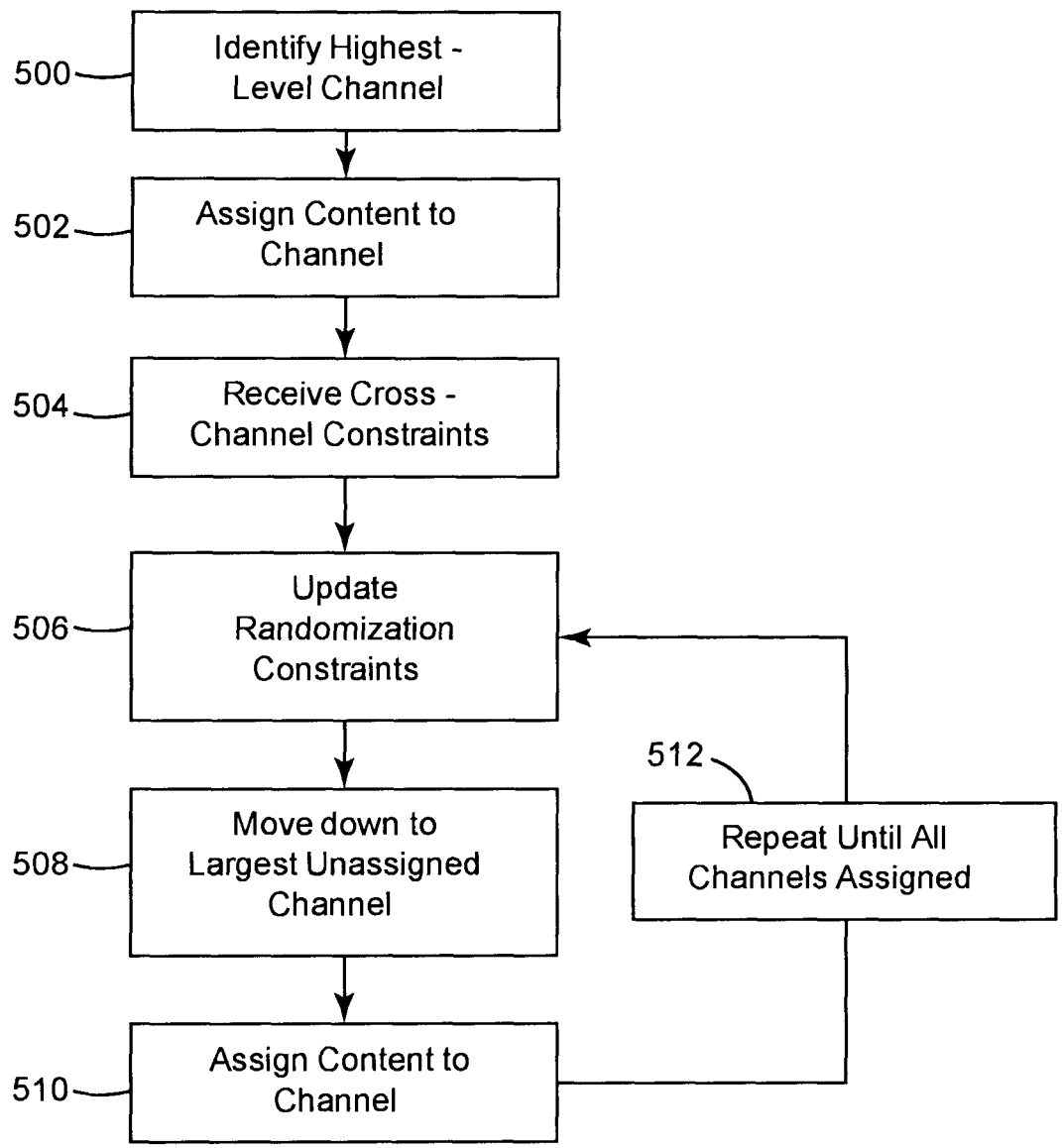
FIG. 5a is a flowchart outlining the assignment of content to multiple channels for measurement of cross-channel impacts regarding content effectiveness.
Figure 5B:
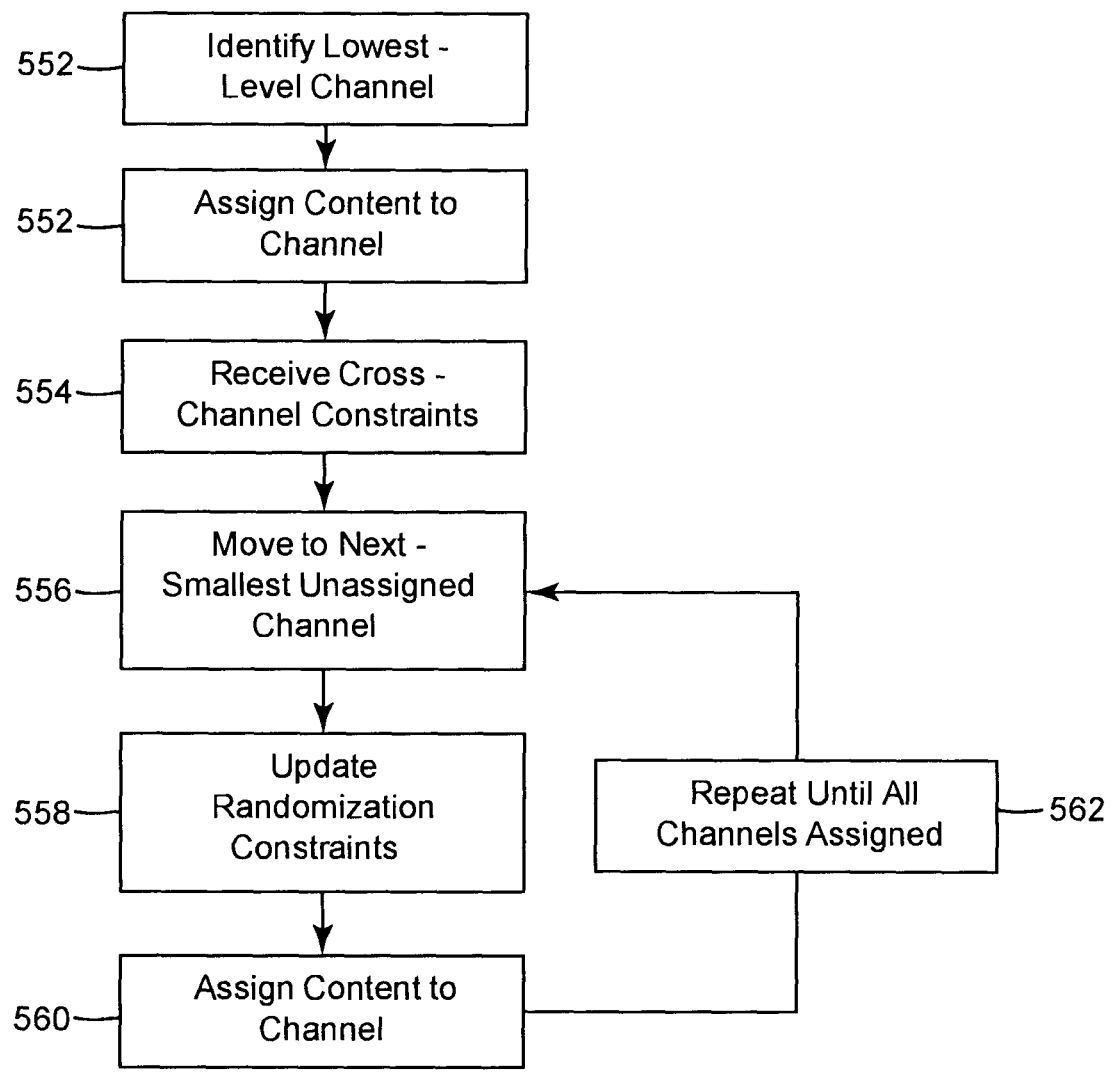
FIG. 5b is a flowchart outlining the assignment of content to multiple channels for measurement of cross-channel impacts regarding content effectiveness.
Figure 5C:
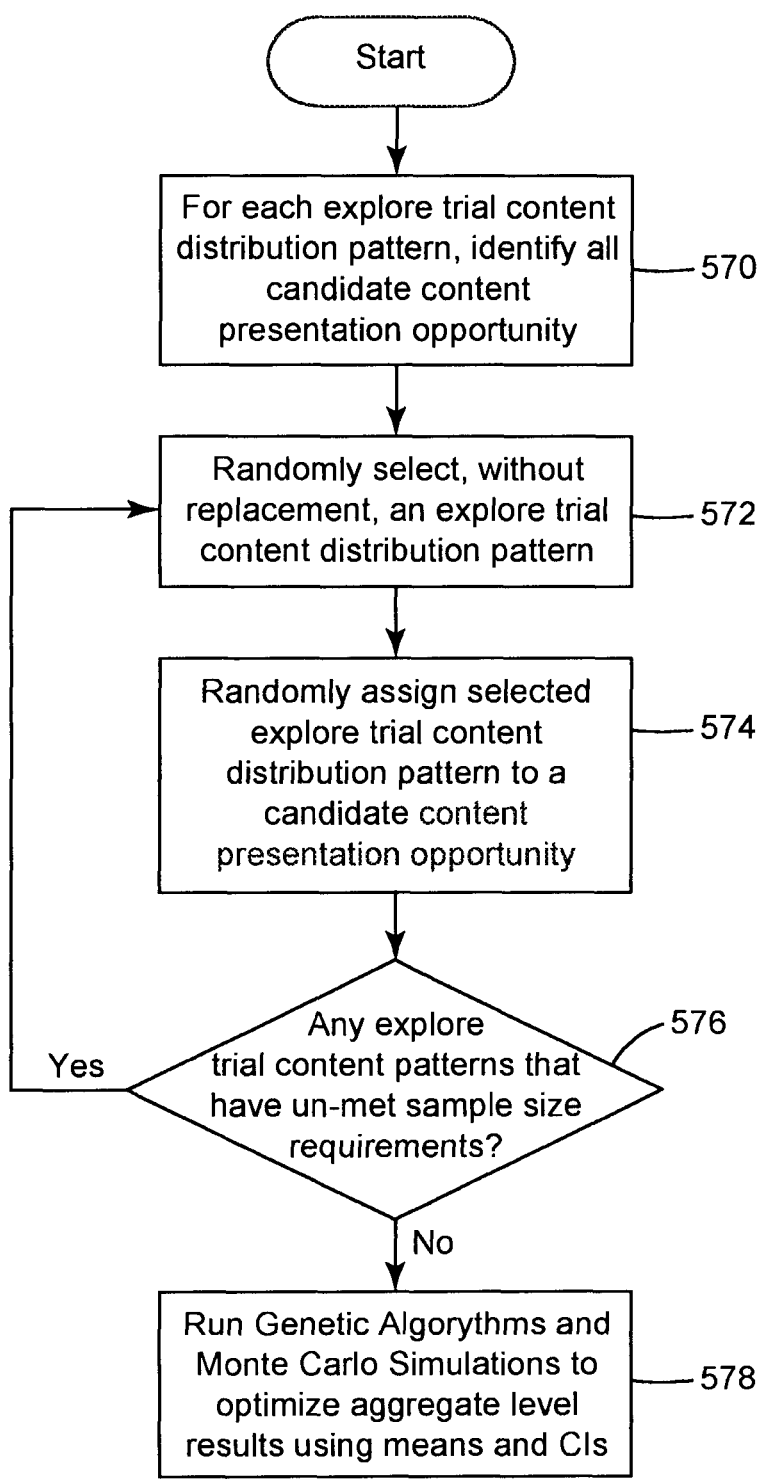
FIG. 5c is a flowchart outlining the assignment of content to multiple channels for measurement of cross-channel impacts regarding content effectiveness.

FIGS. 5A, 5B and 5C detail various exemplary embodiments of the invention where content is assigned to HTSUs across multiple channels to conduct a multi-level experiment. The assignment of content may proceed in a bottom-up manner, as in FIG. 5A, or may proceed in a top-down manner as in FIG. 5B, or may be done by assigning blocks of content to hierarchies of experimental units as in FIG. 5C.

FIG. 5A describes a top-down approach to content assignment. The channel having the largest HTSUs is selected 500, based on the response area of the HTSUs for each channel. The HTSUs of this channel have content assigned to them 502 in accordance with randomization constraints, the assignment of content following the steps described in FIG. 4. Once the HTSUs of the largest channel have been assigned content 502, the cross-channel constraints are received 504. Cross-channel constraints are provided based on an experimental design and the current set of already-assigned content, to exclude confounds from the trials being built based on content and trial-based confound data, such as pieces of content that are being compared against one another, or composed sets of content that are to be presented to recipients in certain times and places. The cross channel constraints and the assignment of content to the largest HTSU are used to update the randomization constraints being used 506. This update is based on the change to the utility of exploring cross-channel effects given the state of the HTSUs that have content assigned to them and the possibility to explore certain cross-channel effects only for certain experimental conditions due to the assignment of content to some HTSUs in the hierarchy. For example, when the content assignments are made to the largest HTSUs in the hierarchy, that dictates the combinations that are possible when controlling the content selected for lower levels in the hierarchy. With updated randomization constraints, the system moves down one level in the hierarchy of channels 508 and uses the randomization constraints to assign content to the HTSUs of the current channel 510. The assignment of content uses the updated randomization constraints from 506 but otherwise follows the assignment process detailed in FIG. 4 and used in step 502. The process is repeated for each channel, until all HTSUs have been filled for the channel having the smallest response area for its HTSUs.

FIG. 5B describes a bottom-up approach to content assignment for an experiment including multiple channels of content communication. The channel whose HTSUs have the smallest response area is selected 550 and content is assigned to those HTSUs in accordance with the process laid out in FIG. 4, using randomization and confound constraints to select content for all the HTSUs for that channel 552. Cross-channel constraints are received 554. The cross-channel constraints are, like those in 504, based on a cross-channel utility function which predicts a utility based on interactions observed in content effectiveness data. The system then moves to the channel with the smallest response area HTSUs that have not been assigned content yet 556. The cross-channel constraints and the content assigned to all prior HTSUs are used to update the randomization constraints 558. In a bottom-up assignment of content to hierarchies of HTSUs, the randomization constraints are updated based on the already-assigned content, which may prevent some cross-channel trials from being implemented during a particular set of overlapping HTSUs; the trials that may still be performed based on the existing assignments of content at the lower levels are identified by comparing the content assignments to the desired cross-channel trials, and the weighted randomization of assigning content to the current level of the hierarchy is altered based on the explore values of the still-viable trials while eliminating consideration of the explore value of trials that may no longer be successfully implemented. The updated randomization constraints are used to assign content to the HTSUs of the current channel of content communication 560, similarly to how content is assigned in 502, 552 and as described in FIG. 4. Once the current level has content assigned 560, the process repeats for each successively larger (by spatial reach factor) channel for content delivery until the HTSUs for the largest channel for content deliver has been assigned content.

FIG. 5C demonstrates a flowchart for a method for assigning content to content presentation opportunities, where the assignment of content for experimental purposes uses multi-channel blocks and then filling remaining HTSUs with exploit content. Candidate content presentation patterns are identified for each explore trial content distribution pattern 570. Explore trial content distribution patterns are a combination of content to be delivered across multiple channels, sometimes to HTSUs having particular attributes. The content may be defined by specific piece of content, or by the state of a number of channel-specific intermediate metrics. The intermediate metric for a given channel can be driven to a particular state to implement the explore trial content distribution pattern through content selection that uses existing causal knowledge of content effectiveness to predict the state of the variable likely to result from a selection of content, and then selecting the content that is predicted to drive the intermediate metric in the proper manner. The explore trial content distribution patterns are generated by using the current data regarding content effectiveness and the confidence intervals of that content effectiveness data, and including cross-channel interactions to find the relative probability of one pattern of content delivery across multiple channels being superior to another; this is computed using the explore utility function. Content presentation opportunities are HTSUs on different channels that have at least partially overlapping spatial and temporal reach factors, and thus the content presented during each of the HTSUs is likely to be acted upon within the same times and places. Candidate content presentation opportunities are content presentation patterns where the attributes of the experimental units within the content presentation pattern match those required by the explore trial content distribution pattern, with the attributes including the channels for content delivery present in the content presentation pattern, such as the day part during which the HTSUs occur, the location of those HTSUs, details regarding those locations where the HTSUs are such as socioeconomic data for the regions contained within the HTSUs, or other market segmenting data that may be material to conducting specific trials of content effectiveness for particular times and locations. Candidate content presentation opportunities are detected by comparing indexed attributes for HTSUs in the content presentation opportunity and the temporal and spatial relationships among them or the hierarchical structures they are organized into across channels to the particular needs of each explore trial content distribution pattern. An explore trial content distribution is selected randomly, without replacement 572. The randomization of this selection may be completely random out of the set of identified explore trial content distributions, or the randomization may be weighted based on the explore utilities of the different explore trial content distributions or constrained based on the demand for particular attributes or the number of channels needed to implement the explore trial content distribution. The selected explore trial content distribution is then assigned randomly to a candidate presentation opportunity 574. The set of candidate presentation opportunities is the same determined for the selected exploit trial content distribution pattern in step 570. The randomization of the selection of a particular candidate presentation opportunity may be completely randomized within the set of candidate presentation opportunities or may be weighted according to the number of exploit trial content distribution patterns that a particular presentation opportunity is a candidate for, favoring the use of candidates less likely to be useful to other, separate exploit trial content distribution patterns. The assignment of a particular candidate presentation opportunity to a particular exploit trial content distribution means that the HTSUs within that assigned candidate presentation opportunity are assigned content based on the exploit trial content distribution pattern. This may dictate that certain pieces of content appear in specific HTSUs within the candidate presentation opportunity, or that causal knowledge of within-channel effects on intermediate metrics are used to select content for each HTSU to produce a given set of states for the intermediate metric for each of the channels the exploit trial content distribution requires. Explore trial content presentation patterns that have un-met sample size requirements that can be filled are identified, and if any are found present 576, the selection and assignment stages 572 and 574 repeat until no more explore trial content distribution patterns can or need to be assigned to the existing content opportunities. This sample size requirement is calculated based on the explore utility function, using power analysis and the current certainty and knowledge regarding content effectiveness to determine the number of samples for each trial to generate the greatest impact. Content is assigned to remaining HTSUs 578 based on exploit utilities, which may be calculated based on causal knowledge of content effectiveness and the confidence intervals for that knowledge. The determination of utility and assignment of content is preferably done using a combination of a genetic algorithm and a Monte Carlo projection using the causal knowledge of content effectiveness and confidence intervals. The content assignments may then be communicated to the various displays that comprise the channels for content delivery and displayed to viewers, producing a coordinated content experience that can be used for experimental trials, and data can be collected regarding the behavior of people in times and locations where these coordinated content experiences are presented.

Figure 6:
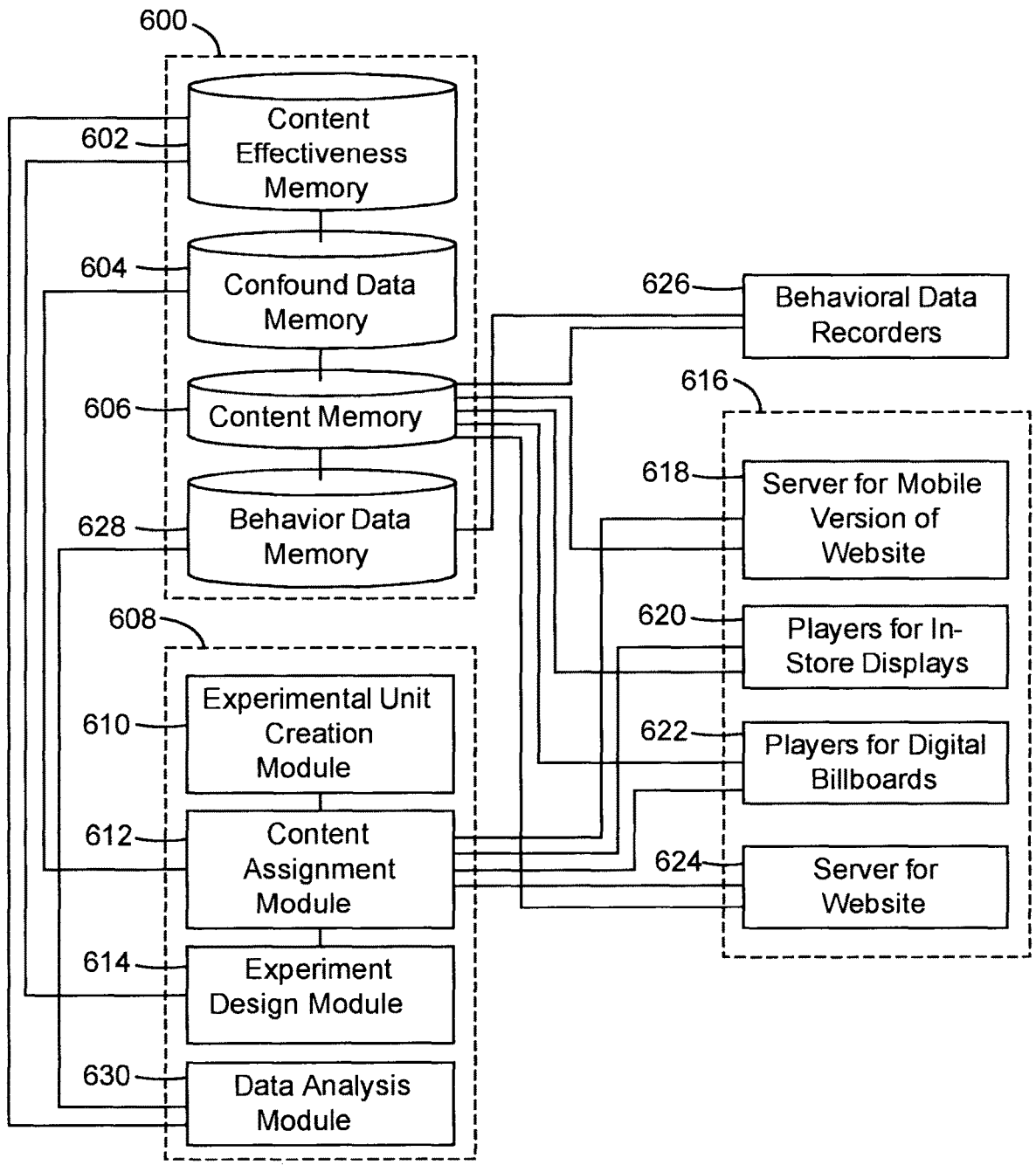
FIG. 6 is a system diagram outlining systems to implement the process of getting feedback regarding content distributed across multiple digital channels.

FIG. 6 represents an embodiment of a system of the invention. Data storage and processors detailed in this figure may be co-located or integrated within the same computing device. Data storage 600 include a memory storing content effectiveness data 602, a memory storing confound data 604, a memory storing content 606, and a behavior data memory 628. These memories may be co-located or separate from one another and each memory may be distributed across multiple physical memory units. The memory storing content effectiveness data contains an index of the pieces of content currently in the system (for example, in memory 606), and the current data on the effectiveness of that content in driving behavior, the parsed and processed behavior data from the data processing unit 630. The memory storing confound data 604 contains a database of the relationships among content, indicating which pieces of content confound each other under different experimental conditions, within and across channels of content delivery. The memory storing content 606 stores content files, which may include elements to be used in content generation, rendered files, instructions for procedural generation of content, rules constraining content creation, elements for use in content creation or percentages of play for content pieces, or other information controlling what appears on a digital display. Functional modules 608 include an experimental unit creation module 610, a content assignment module 612, an experimental design module 614 and a data analysis module 630. Any of these modules may be functionally embodied in software resident in data storage 600, then executed by a microprocessor on a computer system. In some embodiments, the modules may be combined into a single module with functionality as described herein. An experimental unit creation module 610 computes the response area and response duration of HTSUs based on spatial and temporal reach factors for each channel. The experimental unit creation module 610 also is configured to divide display time and locations into HTSUs of the defined response area and response duration, and to organize those HTSUs into hierarchies based on the response areas of the HTSUs for each channel of content communication. A content assignment module 612 assigns content to HTSUs in a manner that applies randomization constraints from an experimental design processor 614 and confound data stored in memory 604 and in accordance with the method detailed in FIG. 4, to assign content across the HTSUs in a trial according to principles of experimental design including blocking, balancing, counterbalancing, and prevention of within-HTSU confounds through use of those randomization constraints and confound data. An experimental design module 614 generates randomization constraints and may generate confound data that is stored in memory 604. The experimental design module may generate confound data for memory 604 by determining which pieces of content are within the same trial and thus confounds to one another. The experimental design processor applies experimental design concepts including various types of trial types (e.g. Latin square, matched-control, etc.), power analyses for trials, and concepts such as blocking, balancing, and counterbalancing to derive the frequencies with which content pieces must play, the experimental conditions the content must play in, and constraints on content play to control for effects such as order effects to supply randomization constraints to the content assignment unit 612. The content assignment unit 612 applies those randomization constraints and may also assign other content to present in the HTSUs to enhance one or more effectiveness metrics based on utility functions, whose output is calculated by the content assignment unit using content effectiveness inputs from a memory storing content effectiveness data 602. The content assignment unit also distributes the content assignments to the various content channels 616, through means such as servers for mobile content, player devices for displays on digital signage networks, player devices for digital billboards, or web servers for general delivery of web pages, social media or IPTV. The content assignment unit is communicatively coupled to the various content channels. The content channels 616 present the content according to the nature of the channel and the received assignment of content, with examples including servers for mobile websites 618 and ordinary websites 624, in-store digital displays 620 and digital billboards 622. For an example directed towards marketing, the in-store display channel 620, players receive the content assignments and the content data and present the assigned content on digital displays situated in store environments, while the server for a mobile website 618 for the mobile device display channel receives requests for content related to a subject and presents the relevant assigned content when a request is made, and the players for the digital billboards 622 present the assigned content on digital billboard display screens. Relevant behaviors occurring within the response area, such as purchases, navigating traffic, or using a disinfectant dispenser are recorded at one or more data recorders 626 situated in the response areas for the HTSUs, recording and storing the data in a response data memory 628. In an exemplary embodiment directed towards marketing, the data recorders 626 could be point-of-sale systems recording the transactions occurring at each data recorder. In some embodiments, the data recorders 626 include both devices to capture an overall metric such as point-of-sale systems for capturing retail transactions, as well as sensors for intermediate metrics for each channel for content delivery, such as store traffic data monitors testing the impact of digital billboards on store traffic. The recorded response data in the response data memory 628 and the content assignment information are processed by a data processing unit 630 to associate the behavior data with the content that could have influenced the behavior. The data processing unit 630 derives the effectiveness of content at altering one or more effectiveness metrics from the behavior data associated with each piece of content and comparisons of the different effects of the pieces and combinations of content and updates a memory storing content effectiveness data 602, storing the relationships observed between the content presented and the behaviors recorded in the response area during response durations by the behavioral data recorders 626.

Figure 7:
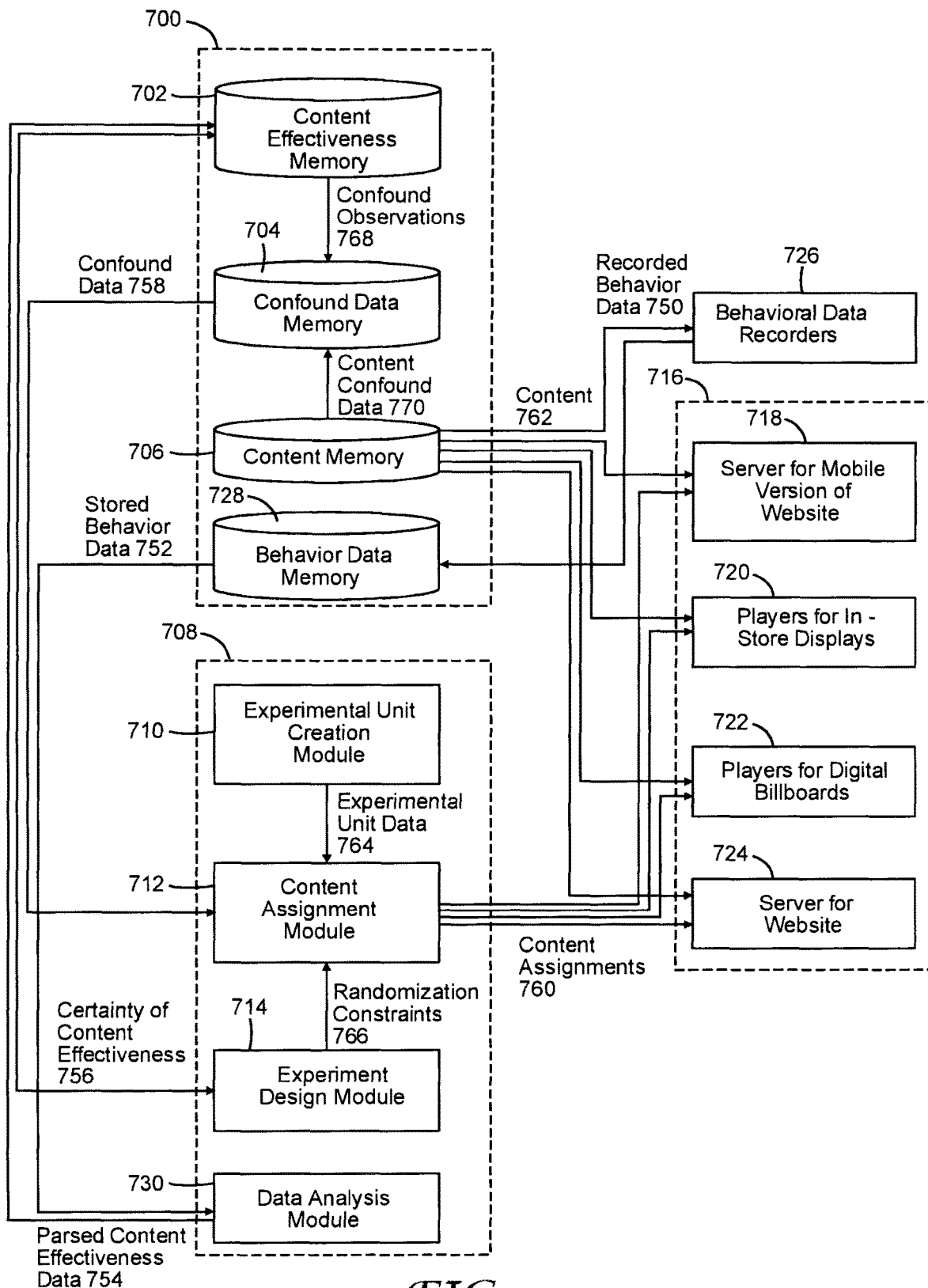
FIG. 7 is a system diagram outlining the types of data shared among the modules of a system configured to implement the process of obtaining feedback regarding content distributed across multiple digital channels.

FIG. 7 represents the flow of data through a system according to one embodiment of the present invention. Behavioral data recorders 726 collect behavior data and the recorded behavior data 750 is transferred to a behavior data memory 728. In some embodiments, the data recorders 726 include both devices to capture an overall metric such as point-of-sale systems for capturing retail transactions as the behavior data, as well as sensors for intermediate metrics for each channel for content delivery, such as such as store traffic data monitors testing the impact of digital billboards on store traffic; this intermediate metric data is included in the behavior data 750 that is transferred to the behavior data memory 728. The data is transferred among the memories and processors by a variety of means, including Ethernet in local area or wide area networks, the internet, wireless communications protocols such as the 802.11 standards, Bluetooth, or direct physical connections between the memories and processors. Stored behavior data 752 in the behavior data memory 728 is transferred to the data analysis processor 730. The data analysis processor parses the data by experimental condition (for example, the time and location of the experimental unit where the data was captured, or the state of intermediate metrics on other channels within the response are and response duration of the experimental unit), producing parsed content effectiveness data 754. This parsed content effectiveness data 754 is transferred to the content effectiveness memory 702. From the content effectiveness data, data on the level of certainty of content effectiveness knowledge 756 is provided to the experiment design processor 714. The level of certainty of content effectiveness knowledge is based on a power analysis of the amount of data and size of the observed effects. The content effectiveness memory also includes observations of confounding effects, where pieces of content exhibit effects on the same or related behaviors, and those confound observations 768 are transferred to and stored in the confound data memory 704. The content memory contains content 762 and the confound data associated with individual pieces of content. The content confound data 770, which includes tags associated with content pieces (the tagging performed either by users, or automatically based on observed or predicted content effects, such as the behavior levels associated with playing a given piece of content), content metadata, or content information stored in a separate database referencing the content pieces, is transferred to and stored in the confound data memory 704. The confound data memory 704 contains data on potential confounds based on observed content effects 768, or from content tags, metadata, strategies and user inputs 770, and this combined confound data 758 is provided to the content assignment processor. The content assignment processor uses confound data 758 and randomization constraints 766 received from the experiment design processor 714 to select content assignments 760. The content assignment 760 may be a playlist, percentages or likelihoods of play within an HTSU, or other means of directing the display of particular pieces of content within an HTSU. In some embodiments, content effectiveness data 772 is fed into utility functions by the content assignment processor 712 to select additional content that is also a part of the content assignment 760. This content assignment 760 and the content 762 from the content memory 706 are supplied to the channels for content delivery 716 including mobile and standard website servers 718 and 724, and players for in-store displays 720 and for digital billboards 722, which display the content 762 in accordance with the content assignments 760. Content recipients then may act on the content in the response areas for the system, with those actions recorded by behavioral data recorders 726 and the data flowing through the system iteratively.

The invention claimed is:

1. A computer-implemented method comprising:
    receiving, for the plurality of content delivery channels as part of a reinforcement machine learning routine, temporal factor data or spatial factor data or both, wherein each content delivery channel comprises one or more displays;
    for a particular content delivery channel of the plurality of content delivery channels, computing a plurality of experimental units, the experimental units comprising (i) a response area based on the spatial factor data for the particular content delivery channel, (ii) a response duration based on the temporal factor data for the particular content delivery channel, or both;
    arranging the plurality of experimental units into hierarchies based on overlap of the response areas of each experimental unit;
    generating randomization constraints and confound data via an experimental design processor, and wherein the confound data is then stored in memory;
    assigning content to one or more levels of the hierarchies utilizing the randomization constraints and the confound data;
    updating the randomization constraints based on the assigning of content to the hierarchies as part of the reinforcement learning routine;
    assigning content to one or more additional levels of the hierarchies utilizing the updated randomization constraints and the confound data as part of the reinforcement machine learning routine; and
    computing a content playlist for each content delivery channel based on the experimental units, wherein the content playlist at least specifies content to be played on each content delivery channel.

2. The computer-implemented method of claim 1, wherein computing the content playlist additionally comprises the order of the content to be presented, the relative or absolute frequency of play within an experimental unit, or both.

3. The computer-implemented method of claim 2, further comprising: causing the content delivery channels to play content consistent with the content playlist.

4. The computer-implemented method of claim 1, wherein the response area is derived by doubling the spatial factor for a channel for content delivery based on the spatial factor data being received for the plurality of content delivery channels.

5. The computer-implemented method of claim 1, wherein the response duration is derived by doubling the temporal factor based on the temporal factor data being received for the plurality of content delivery channels.

6. The computer-implemented method of claim 1, wherein a randomization constraint is derived using functions comprising an explore utility function and an exploit utility function.

7. The computer-implemented method of claim 1, further comprising collecting data indicative of behavior in the experimental units.

8. The computer-implemented method of claim 1, wherein a channel for content delivery is selected from a group of channels of content delivery, comprises fixed-location digital displays, digital billboards, mobile devices, and web pages.

9. The computer-implemented method of claim 1, wherein the content playlist is determined based on varying a combination of content randomly, with experimental controls.

10. A computer-based system for conducting multivariate experiments on content effectiveness, comprising:
    a plurality of content delivery channels, each comprising one or more displays;
    memory;
    an experimental design module configured to generate randomization constraints and confound data via from an experimental design processor, wherein the confound data is then stored in the memory;
    a processor coupled to the memory, wherein the processor is configured to:
        receive as part of a reinforcement machine learning routine spatial factor data or temporal factor data or both, and based thereon, compute a plurality of experimental units associated with one content delivery channel of the plurality of content delivery channels, comprising (i) a response area that is based on the spatial factor data, (ii) a response duration based on the temporal factor data, or both;
        arrange the plurality of experimental units into at least one of the hierarchies based on geographic overlap of the response areas; and
    a content assignment module configured to assign, from a content database having information defining a plurality of different content pieces, content pieces associated with some of the experimental units to one or more levels of the hierarchies utilizing at least one of the randomization constraints and the confound data;
    update the randomization constraints based on the assigning of content to the hierarchies as part of the reinforcement learning routine;
    assign content to one or more additional levels of the hierarchies utilizing the updated randomization constraints and the confound data as part of the reinforcement machine learning routine; and compute a content playlist for each content delivery channel based on the experimental units, wherein the content playlist at least specifies content to be played on each content delivery channel.

11. The computer-based system of claim 10, further comprising causing the content pieces to be displayed on content delivery channels in a manner consistent with the playlist.

12. The computer-based system of claim 10, further comprising a plurality of data collection devices situated within the response areas of the experimental units.

13. The computer-based system of claim 10, wherein the response area is derived by doubling the spatial factor for a channel for content delivery based on the spatial factor data being received for the plurality of content delivery channels.

14. The computer-based system of claim 10, wherein the response duration is derived by doubling the temporal factor for a channel for content delivery based on the temporal factor data being received for the plurality of content delivery channels.

15. The computer-based system of claim 10, further comprising a content effectiveness database comprising data regarding known content effectiveness of various of content pieces in the content database.

16. The computer-based system of claim 10, further comprising: receiving response data from response areas.

17. The computer-based system of claim 16, further comprising: parsing the response data based on an applicable experimental condition.

18. The computer-based system of claim 17, wherein the experimental condition comprises the content displayed during an experimental unit, the location of the experimental unit, and a time that the experimental unit started and ended.

19. The computer-based system of claim 10, wherein a channel for content delivery comprises fixed-location digital displays, digital billboards, mobile devices, or web pages.

20. The computer-based system of claim 10, further comprising a plurality of data collection devices, and wherein the data collection devices comprise intermediate metric sensors associated with each channel for content communication and overall metric sensors associated with a cross-channel metric.

* * * * *